May 3, 1955  W. G. BERANEK ET AL  2,707,363
LAWN MOWER

Filed Oct. 26, 1953  2 Sheets-Sheet 1

Wenceslaus G. Beranek
Thomas T. Buresh
INVENTORS

May 3, 1955 W. G. BERANEK ET AL 2,707,363
LAWN MOWER
Filed Oct. 26, 1953 2 Sheets-Sheet 2

Wenceslaus G. Beranek
Thomas T. Buresh
INVENTORS

BY *Clarence A. O'Brien*
*and Harvey B. Jacobson*
Attorneys

United States Patent Office 2,707,363
Patented May 3, 1955

2,707,363
LAWN MOWER

Wenceslaus G. Beranek and Thomas T. Buresh, Touhy, Nebr.

Application October 26, 1953, Serial No. 388,159

1 Claim. (Cl. 56—25.4)

This invention relates to agricultural equipment and more particularly to a novel power lawn mower.

The primary object of this invention resides in the provision of a two-wheel type of rotary blade power lawn mower which includes means for easily adjusting the height of the blade above the ground as engaged by a suitable cup.

The construction of this invention features a saucer shaped guard secured to the driven shaft of this device, the guard supporting a cylindrical casing carried by a frame extending outwardly from the axle on which the ground engaging wheels of the lawn mower are mounted. The frame has slidably attached thereto a telescoping member which is attached to the cylindrical casing to thereby permit the cylindrical casing to be moved inwardly and outwardly from the axle. Supported by the axle is the motor providing the driving force for this power lawn mower. Hence, since pulleys and an endless belt are utilized in transmitting power from the motor to the driven shaft which extends through the cylindrical casing, the frame and the telescoping member providing means for both adjusting the tension on the endless belt while also providing means for spacing the blade from the supporting wheels of a lawn mower and above the ground.

Still further objects and features of this invention reside in the provision of a two-wheel type of rotary blade power lawn mower that is strong and durable, simple in construction and manufacture, capable of being readily constructed at a relatively low cost thereby permitting wide distribution.

These, together with the various ancillary objects and features of the invention which will become apparent as the following description proceeds, are attained by this lawn mower a preferred embodiment of which has been illustrated in the accompanying drawings, by way of example only, wherein.

Figure 2:
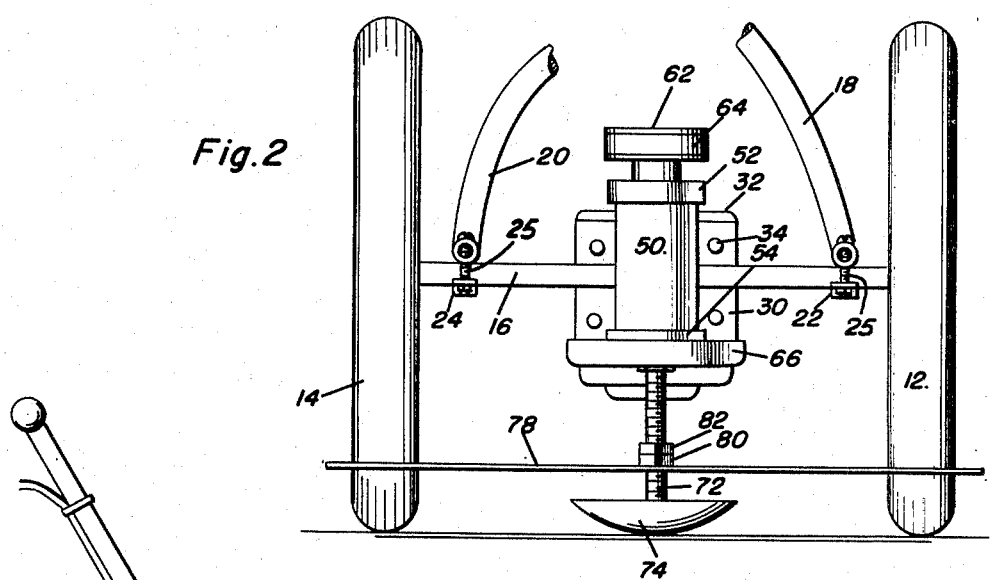
Figure 2 is an enlarged fragmentary front end view of this apparatus.
Figure 1:
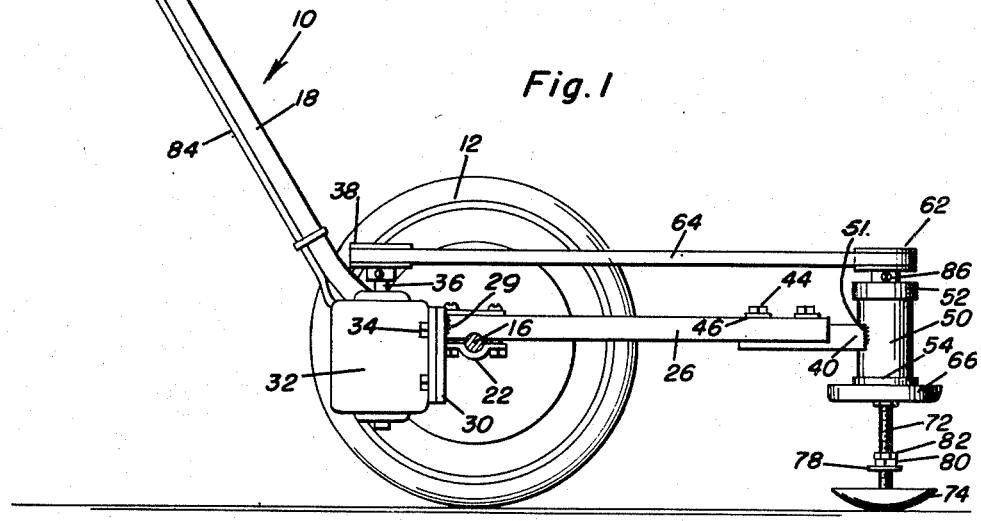
Figure 1 is a side elevational view of the lawn mower comprising the present invention, with parts thereof being broken away to show other parts in greater detail.
Figure 3:
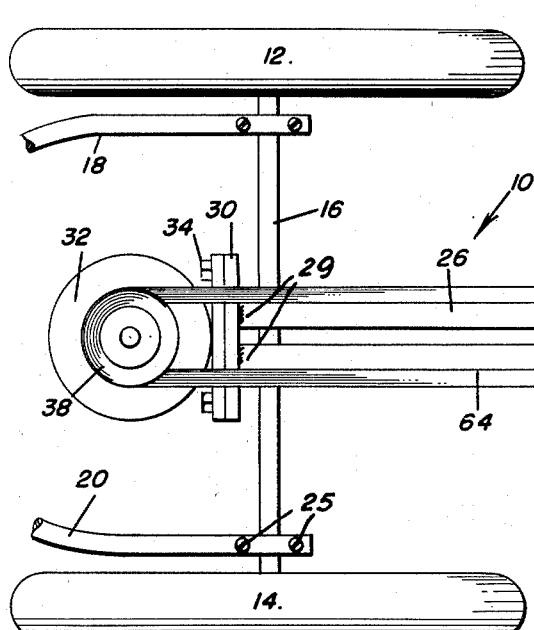
Figure 3 is an enlarged top plan view of the device showing in greatest detail the construction of the frame and of the saucer shape guard used in supporting the cylindrical casing to which the telescoping member is attached.
Figure 4:
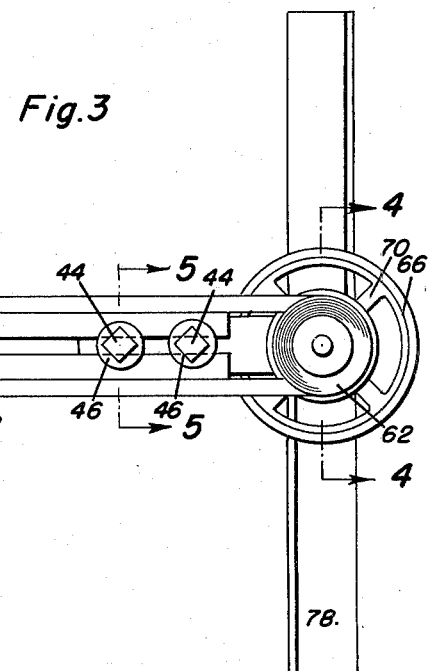
Figure 4:
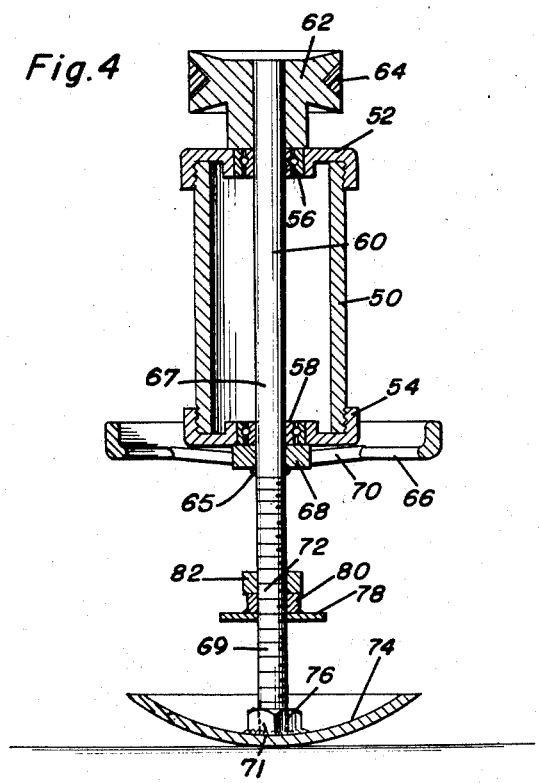
Figure 5:
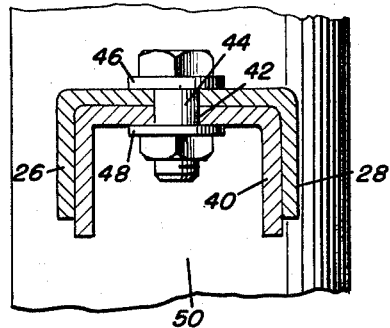

Figure 4 is an enlarged vertical sectional view as taken along the plane of line 4—4 in Figure 3 and illustrating in an enlarged scale the specific construction of the casing and the manner in which the saucer supports such casing; and Figure 5 is an enlarged sectional detail view as taken along the plane of line 5—5 in Figure 3, illustrating the manner in which the telescoping member is secured to the frame.

With continuing reference to the accompanying drawings wherein like reference numerals designate similar parts throughout the various views, reference numeral 10 generally designates the power lawn mower comprising the present invention. This lawn mower 10 includes a pair of spaced ground engaging wheels 12 and 14 which are rotatably mounted on an axle 16 in a conventional manner. Clampingly secured to the axle 16 and extending angularly upwardly therefrom are handles 18 and 20 which are held in place by means of clamping elements 22 and 24 engaging the axle 16 and held in place by means of suitable bolts 25 or like fasteners. Secured to the axle 16 are a pair of spaced parallel angle shaped members 26 and 28 forming the frame of this lawn mower. Welded as at 29 or otherwise attached to the angle members 26 and 28 is a vertical support plate 30 to which an electric motor 32 is secured by means of bolts as at 34. Since the frame members 26 and 28 are carried by the axle 16, the motor 32 is likewise supported by the axle 16. The motor 32 drives a drive shaft 36 on which a drive pulley 38 is mounted.

Received between the angle frame members 26 and 28 is a channel-shaped telescoping member 40 having apertures therethrough as at 42 through which bolts 44 or other suitable fasteners extend, the bolts 44 carrying upper washers as at 46, and lower washers as at 48 for clampingly lockingly holding the telescoping member 40 in an adjusted position relative to the frame members 26 and 28. The telescoping member 40 has a cylindrical casing 50 welded as at 51 or otherwise attached thereto, the cylindrical casing 50 having its upper and lower outer ends threaded for engagement by upper and lower threaded bearing retainer caps 52 and 54 which carry bearing assemblies 56 and 58 respectively. A driven shaft 60 is rotatably mounted by means of the bearings 56 and 58 in the bearing retaining caps 52 and 54 and carries a driven pulley wheel 62. An endless belt 64 is entrained about the pulleys 38 and 62 for rotating the driven shaft 60. Welded as at 65 to the medial portions 67 of the driven shaft 60 is a saucer shaped guard 66 having a hub 68 supporting the bearing assembly 58 and having outwardly divergent spokes 70 connected to the rim of the guard 66. The spokes 70 are utilized so that dirt or other foreign matter falling into the saucer guard 66 may readily fall through the interstices between the spoke 70.

The lower portion 69 of the shaft 60 is threaded as at 72 and threadedly secured on the lowermost edge 71 of the driven shaft 72 is a cup shaped ground engaging member 74 carrying a nut 76 which is threadedly received on the shaft 72. The cutting blade 78 has an internally threaded hub 80 threadedly secured on the threaded portion 72 of the shaft 60. The lock nut 82 is utilized to hold the blade 78 in an adjusted position above the cup shaped ground engaging member 74 thereby predetermining the height of the blade 78 above the ground and hence the height of the grass to be cut.

The operation of this lawn mower is quite evident from an inspection of the drawings. The motor 32 provides mechanical power which it converts from the electrical power received through suitable conductors as at 84. This mechanical power is transmitted by the belt 64 to the driven shaft 60 and thence to the blade 78. Inasmuch as the pulley wheel 62 is locked to the shaft 60 in an adjusted position by means of the set screw 86, the frame 26 and telescoping member 40, together with the cylindrical casing 50 is prevented from an upward movement relative to the shaft 60. Likewise, since the saucer shaped guard 66 is rigidly attached to the shaft 60 the casing 50 and hence the frame 26 is prevented from any downward motion relative to the shaft 60 and the bearing 58 also acts as a thrust bearing in view of its cooperation with the hub 68 of the guard 66.

Since from the foregoing the construction and advantages of this lawn mower are readily apparent, further description is believed to be unnecessary.

However, since numerous modifications will readily occur to those skilled in the art, after a consideration of the foregoing specification and accompanying drawings, it is not intended to limit the invention to the precise embodiment shown and described, but all suitable modifications and equivalents may be readily resorted to.

What is claimed as new is as follows:

A lawn mower comprising an axle, a pair of spaced wheels mounted on said axle, handles connected to said axle, a motor supported by said axle having a vertically extending drive shaft, an elongated frame secured to said axle and extending forwardly therefrom, a telescoping member adjustably secured to said frame, a cylindrical casing secured to said telescoping member, a vertically extended driven shaft journaled in said casing, means drivingly operatively connecting said drive shaft to said driven shaft, a blade adjustably secured to said driven shaft, and a ground engaging cup secured to said drive shaft at the bottom end thereof and rotatable therewith, said frame comprising a pair of spaced angle members, said telescoping member being of channel shape and being received between said angle members and being movable to space said blade from said wheels, the lower portion of said driven shaft being threaded, said blade having a threaded hub threadedly secured on said lower portion of said driven shaft, and means lockingly holding said hub in an adjusted position on said driven shaft, a saucer-shaped guard of greater diameter than said casing secured to said driven shaft, said guard including a guard hub secured on said driven shaft, an outer rim spaced from said guard hub, and spokes interconnecting said guard hub and said rim, said spokes being spaced to permit matter to fall therebetween, said guard preventing upward movement of said shaft with respect to said casing, said casing having a bearing through which said driven shaft extends supported by said hub.

References Cited in the file of this patent

UNITED STATES PATENTS

| | | |
|---|---|---|
| 2,243,133 | Steiner et al. | May 27, 1941 |
| 2,538,230 | Boggs | Jan. 16, 1951 |
| 2,539,934 | Smith et al. | Jan. 30, 1951 |
| 2,595,976 | Patterson | May 6, 1952 |
| 2,669,826 | Watrous | Feb. 23, 1954 |